US012644255B2

(12) United States Patent
Cheong et al.

(10) Patent No.: US 12,644,255 B2
(45) Date of Patent: Jun. 2, 2026

(54) AGRICULTURAL TRACTOR

(71) Applicant: LS MTRON LTD., Anyang-si (KR)

(72) Inventors: Seung Ho Cheong, Anyang-si (KR); Ok Shik Shin, Anyang-si (KR); Jeong Hoon Jang, Anyang-si (KR); Daekeon Shin, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 61 days.

(21) Appl. No.: 18/957,100

(22) Filed: Nov. 22, 2024

(65) Prior Publication Data

US 2025/0084615 A1 Mar. 13, 2025

Related U.S. Application Data

(63) Continuation of application No. PCT/KR2023/007728, filed on Jun. 7, 2023.

(30) Foreign Application Priority Data

Jun. 10, 2022 (KR) ........................ 10-2022-0070706
Jun. 2, 2023 (KR) ........................ 10-2023-0071239

(51) Int. Cl.
*E02F 9/20* (2006.01)
*A01B 69/00* (2006.01)
(Continued)

(52) U.S. Cl.
CPC .......... *E02F 9/2025* (2013.01); *A01B 69/007* (2013.01); *B60K 20/04* (2013.01);
(Continued)

(58) Field of Classification Search
CPC ..... E02F 9/2025; E02F 9/2004; E02F 9/2066; A01B 69/007; A01B 33/08; A01B 69/00;
(Continued)

(56) References Cited

U.S. PATENT DOCUMENTS

2009/0029826 A1* 1/2009 Eguchi .................. F16D 48/066
477/39
2010/0101887 A1* 4/2010 Kawashiri ............. B60W 10/06
180/335
(Continued)

FOREIGN PATENT DOCUMENTS

JP 2000233659 A 8/2000
JP 2012090606 A 5/2012
(Continued)

OTHER PUBLICATIONS

Machine translation of JP-2020000171-A (Year: 2020).*
(Continued)

*Primary Examiner* — Anne Marie Antonucci
*Assistant Examiner* — Patrick Daniel Mohl
(74) *Attorney, Agent, or Firm* — K&L Gates LLP

(57) ABSTRACT

The present disclosure is directed to an agricultural tractor. The agricultural tractor according to the present disclosure may perform gear shifting and RPM adjustment with the same operation pedal according to a control mode, may perform gear shifting with an operation pedal or a sub-controller, and may change a driving direction with a steering handle or the sub-controller. According to the present disclosure, the risk of erroneous operation and the like is minimized, work efficiency is improved, and the convenience of controlling an agricultural tractor is also improved.

16 Claims, 7 Drawing Sheets

(51) Int. Cl.

| | |
|---|---|
| B60K 20/04 | (2006.01) |
| F16H 59/18 | (2006.01) |
| F16H 61/02 | (2006.01) |

(52) U.S. Cl.
CPC .......... E02F 9/2004 (2013.01); E02F 9/2066 (2013.01); F16H 59/18 (2013.01); F16H 61/0204 (2013.01)

(58) Field of Classification Search
CPC ......... B60K 20/04; B60K 26/02; F16H 59/18; F16H 61/0204; B60Y 2200/221
See application file for complete search history.

(56) References Cited

U.S. PATENT DOCUMENTS

2015/0198074 A1* 7/2015 Mori .................. F01N 13/1805
60/286

2018/0326845 A1* 11/2018 Ogura .................... B60K 20/04
2021/0070383 A1* 3/2021 Cheong ................. A01D 69/08
2021/0180623 A1* 6/2021 Tanaka ................. E02F 9/2267

FOREIGN PATENT DOCUMENTS

| | | | | | |
|---|---|---|---|---|---|
| JP | 2020000171 A | * | 1/2020 | ............. | B60K 20/02 |
| JP | 2022010724 A | | 1/2022 | | |
| KR | 1019970075262 A | | 12/1997 | | |
| KR | 101828866 B1 | | 2/2018 | | |
| KR | 20200119439 A | | 10/2020 | | |

OTHER PUBLICATIONS

International Search Report for related International Application No. PCT/KR2023/007728; action dated Dec. 14, 2023; (3 pages).
Written Opinion for related International Application No. PCT/KR2023/007728; action dated Dec. 14, 2023; (5 pages).

* cited by examiner

FORWARD

LEFT ←→ RIGHT

REARWARD

FORWARD

LEFT ← → RIGHT

REARWARD

AGRICULTURAL TRACTOR

CROSS-REFERENCE TO RELATED APPLICATION

This application is a Continuation Applications of International Application No. PCT/KR2023/007728 filed on Jun. 7, 2023, which claims priority to and the benefit of Korean Patent Application No. 10-2022-0070706, filed on Jun. 10, 2022, and Korean Patent Application No. 10-2023-0071239, filed Jun. 2, 2023, the disclosures of which are incorporated herein by reference in its entirety.

FIELD

The present disclosure relates to an agricultural tractor, and more particularly, to technology capable of coupling an implement and performing work.

BACKGROUND

Agricultural tractors are drivable agricultural vehicles that can selectively mount various types of implements thereon and perform agricultural work.

Agricultural tractors basically perform work by moving or driving across various work sites on their own. Accordingly, agricultural tractors need to have driving and steering functions.

Furthermore, agricultural tractors need to have a coupling function that enables the selective mounting and coupling of various types of implements.

In general, implements coupled to agricultural tractors do not have their own power. Accordingly, implements are operated by utilizing the driving power generated by the drive engines of agricultural tractors.

For example, an implement such as a rotavator may rotate a rotary blade by using the rotational power of a drive engine. Accordingly, it is necessary to connect the rotational power of the drive engine to the rotavator.

For example, an implement such as a loader that consists of a bucket and a boom is operated by a hydraulic cylinder. Accordingly, it is necessary to connect the hydraulic pressure, generated by the hydraulic pump that is operated with the driving power of a drive engine, to the loader.

In this manner, the coupling function of agricultural tractors includes a coupling function for mechanical coupling with an implement and a coupling function for the connection of driving power.

Therefore, once an implement has been mounted on an agricultural tractor, the drive engine of the agricultural tractor provides not only the driving power required for driving but also the working power required for work.

Meanwhile, agricultural tractors are mainly operated in the state of performing driving and working in parallel. However, there are often cases where the workload is large, in which case it is necessary to increase the working power independently of the driving power.

In order to increase the working power, the revolutions per minute (hereinafter referred to as 'RPM') of the drive engine needs to be increased. Accordingly, agricultural tractors are provided with a governor including a governor lever.

The governor lever is disposed in an area where a driver sitting in the driver's seat can operate it with his or her hand.

The driver may set the RPM of the drive engine to a specific value by fixing the governor lever at a specific position, or may adjust the RPM of the drive engine by operating the governor lever as desired.

In addition, agricultural tractors are provided with a work controller configured to control various types of work. The work controller has a control lever. The control lever is disposed in an area where a driver sitting in the driver's seat can operate it with his or her hand.

FIG. 1 shows the layout of the space in which a driver's seat DS is located in a conventional agricultural tractor. The agricultural tractor has a gear shifting pedal 42 and a steering handle 32a.

The gear shifting pedal 42 is intended to vary the driving speed.

Agricultural tractors require frequent gear shifting during work, and many types of agricultural tractors adopt a hydrostatic transmission capable of performing continuously variable gear shifting for this purpose. When a hydrostatic transmission is adopted, the gear shifting pedal 42 needs to be provided as a pair of a forward pedal 42a and a reverse pedal 42b. The forward pedal 42a is intended for forward acceleration, and the reverse pedal 42b is intended for rearward acceleration.

The steering handle 32a is provided in the form of a steering wheel. The driver may hold and rotate the steering handle 32a with his or her hand, and the rotation axis direction of steering wheels (usually front wheels) changes by an amount corresponding to the amount of rotation.

A governor lever 51 is disposed near the steering handle 32a.

A control lever 21 is disposed on the right side of the steering handle 32a and a driver.

For reference, a pair of brake pedals BP1 and BP2 intended for deceleration or stopping are disposed on the left side under the steering handle 32a. Accordingly, the gear shifting pedals 42 are disposed on the right side under the steering handle 32a.

Next, an example of performing work on an agricultural tractor having the above-described basic structure will be discussed.

For example, a driver may perform work using a loader (hereinafter referred to as 'loader work').

The driver drives the agricultural tractor with the RPM value required for routine loader work set by using the governor lever 51. In this case, the driver sitting in the driver's seat DS operates the steering handle 32a with the left hand and the control lever 21 with the right hand. Then, the driver operates the brake pedals BP1 and BP2 with the left foot and the gear shifting pedal 42 with the right foot.

That is, the driver performs the loader work of moving a heavy load while controlling the operations of the bucket and boom, forward and reverse driving, and the changing of a driving direction using both hands and both feet. Meanwhile, when a heavy load is lifted, there are cases where there is required the working power higher than the working power based on the RPM value set by the governor lever 51. Then, the driver increases the RPM value of the drive engine by operating the governor lever 51 with the right hand. In this case, the driver's right hand is moved away from the control lever 21, so that he or she cannot control the operations of the bucket and the boom. Accordingly, the continuity of the work is naturally hindered. In other words, it is cumbersome to control the agricultural tractor, and the work efficiency is also reduced.

The driving operation for driving and the working operation for the operation of an implement are generally not related to each other. Accordingly, they can be operated separately from each other, which is rather more efficient. In view of this, there has been reported a technology (herein-after referred to as 'conventional art') that provides a control lever 21 for controlling the operation of a loader with a governor button for controlling the RPM of a drive engine.

When the conventional art is applied, the control of the working operation and the adjustment of the RPM of the drive engine can be performed using one hand, and opera-tions for driving can be performed using the other hand and both feet.

Meanwhile, according to the conventional art, there are the following problems:

First, there is no operational correlation between the RPM adjustment operation and the loader operation, so that the intuitiveness is low. For example, the loader operation is the operation of pushing or pulling the control lever 21 in the forward-rearward or left-right direction, whereas the RPM adjustment operation is the operation of pressing the gov-ernor button. Accordingly, there are that much confusion and inconvenience in the operation.

Second, there is a risk of erroneous operation because the operation control and the RPM adjustment are both per-formed with one hand. For example, there may be an unintended operation of the governor button while the operation of the loader is performed. Furthermore, this may momentarily confuse the driver and lead to an unexpected work failure or accident.

<div align="center">CONVENTIONAL ART LITERATURE</div>

<div align="center">Patent Document</div>

(Patent Document 1) Korean Patent Application Publica-tion No. 10-1997-0075262

<div align="center">SUMMARY</div>

The present disclosure has been conceived based on the following challenges:

First, in order to prevent confusion or erroneous operation during a work process, the operation for adjustment the RPM of a drive engine and the operation for operating an implement need to be separated and performed simultane-ously.

Second, the accuracy of operations for work needs to be increased by simplifying the operations required for driving during a work process.

Third, each operation needs to be independent and main-tain or acquire intuitiveness.

An agricultural tractor according to a first aspect of the present disclosure includes: a drive engine configured to generate driving power that varies according to the variation of RPM; a coupler configured to couple an implement capable of performing work by utilizing the driving power of the drive engine; a work controller configured to control the work operation of the implement; a driving mechanism configured to perform driving with the driving power of the drive engine, and provided with steering wheels for chang-ing a driving direction; a steerer provided with a steering handle for adjusting the rotation axis direction of the steer-ing wheels to change the direction of the driving performed by the driving mechanism; a transmission configured to transmit the driving power of the drive engine to the driving mechanism, and also configured to be electronically con-trolled to perform the gear shifting of the driving mecha-nism; an operation pedal configured to perform gear shifting by operating the transmission or adjust RPM of the drive engine; a pedal sensor configured to detect the amount of depression of the operation pedal; a controller configured to operate in a first control mode for generating a first control signal corresponding to the amount of depression of the operation pedal detected by the pedal sensor or in a second control mode for generating a second control signal corre-sponding to the amount of depression of the operation pedal; and a mode selection switch configured to enter a command to cause the controller to selectively operate in the first control mode or in the second control mode; the first control signal generated by the controller in the first control mode is a signal for controlling the transmission to perform gear shifting, and the second control signal generated by the controller in the second control mode is a signal for adjust-ing the RPM of the drive engine; and, in the first control mode, a driver performs gear shifting by the transmission by operating the operation pedal, and, in the second control mode, the driver performs work by the implement using the work controller while adjusting the RPM of the drive engine by operating the operation pedal.

The agricultural tractor may further include a governor configured to adjust the RPM of the drive engine to control working power transmitted from the drive engine to the implement; and, in the first control mode, the controller adjusts the RPM of the drive engine in accordance with operation of the governor, and, in the second control mode, the controller adjusts the RPM of the drive engine in accordance with the operation of the operation pedal.

In the second control mode, the controller may adjust the RPM of the drive engine to a larger RPM value between an RPM value set by the governor and an RPM value corre-sponding to the operation of the operation pedal.

The agricultural tractor may further include a sub-con-troller configured to perform the gear shifting of the driving mechanism by operating the transmission; and the controller may perform gear shifting by controlling the transmission in accordance with the amount of depression of the operation pedal detected by the pedal sensor in the first control mode, and may perform gear shifting by controlling the transmis-sion in accordance with the operation of the sub-controller in the second control mode.

The driving mechanism may further include a steering valve for being electronically controlled to adjust the rota-tion axis direction of the steering wheels, and the controller may change the rotation axis direction of the steering wheels by controlling the steering valve in accordance with the operation of the steering handle.

The sub-controller may be operable to operate the steering valve;

the controller may change the rotation axis direction of the steering wheels by controlling the steering valve in accordance with the operation of the steering handle in the first control mode, and may change the rotation axis direction of the steering wheels by controlling the steering valve in accordance with the operation of the sub-controller in the second control mode; the sub-controller may include a rod-shaped operation lever; and, in the second control mode, the controller may perform gear shifting by controlling the transmission when the operation lever is operated in a first direction by the driver, and the controller may change the rota-tion axis direction of the steering wheels by controlling the steering valve when the operation lever is operated in a second direction perpendicular to the first direc-tion.

The work controller may include a rod-shaped control lever; and the operation lever may be disposed on a left side of the steering handle and the control lever may be disposed on a right side of the steering handle, so that the driver sitting in a driver's seat can operate the operation lever with a left hand and the control lever with a right hand.

When the second control mode is selected by the mode selection switch, the controller may wait for the driver's operation with the transmission controlled such that a vehicle speed becomes 0 km/h.

An agricultural tractor according to a second aspect of the present disclosure includes: a drive engine configured to generate driving power that varies according to the variation of RPM; a coupler configured to couple an implement capable of performing work by utilizing the driving power of the drive engine; a work controller configured to control the work operation of the implement; a driving mechanism configured to perform driving with the driving power of the drive engine, and provided with steering wheels for changing a driving direction; a steerer provided with a steering handle for adjusting the rotation axis direction of the steering wheels to change the direction of the driving performed by the driving mechanism; a transmission configured to transmit the driving power of the drive engine to the driving mechanism, and also configured to be electronically controlled to perform the gear shifting of the driving mechanism; an operation pedal configured to perform gear shifting by operating the transmission; a pedal sensor configured to detect the amount of depression of the operation pedal; a sub-controller configured to perform the gear shifting of the driving mechanism by operating the transmission; a controller configured to operate in a first control mode for performing gear shifting corresponding to the amount of depression of the operation pedal detected by the pedal sensor or in a second control mode for performing gear shifting corresponding to the operation of the sub-controller; and a mode selection switch configured to enter a command to cause the controller to selectively operate in the first control mode or in the second control mode; and, in the first control mode, a driver performs gear shifting by the transmission by operating the operation pedal, and in the second control mode, the driver performs work by the implement using the work controller while performing gear shifting by the transmission by operating the sub-controller.

The driving mechanism may further include a steering valve for being electronically controlled to adjust the rotation axis direction of the steering wheels, and the controller may change the rotation axis direction of the steering wheels by controlling the steering valve in accordance with the operation of the steering handle.

An agricultural tractor according to a third aspect of the present disclosure includes a drive engine configured to generate driving power that varies according to the variation of RPM; a coupler configured to couple an implement capable of performing work by utilizing the driving power of the drive engine; a work controller configured to control the work operation of the implement; a driving mechanism configured to perform driving with the driving power of the drive engine, and provided with steering wheels for changing a driving direction and a steering valve for being electronically controlled to adjust the rotation axis direction of the steering wheels; a steerer provided with a steering handle for adjusting the rotation axis direction of the steering wheels to change the direction of the driving performed by the driving mechanism; a transmission configured to transmit the driving power of the drive engine to the driving mechanism, and also configured to be electronically controlled to perform the gear shifting of the driving mechanism; an operation pedal configured to perform gear shifting by operating the transmission; a pedal sensor configured to detect the amount of depression of the operation pedal; a sub-controller configured to adjust the rotation axis direction of the steering wheels by operating the steering valve; a controller configured to operate in a first control mode for adjusting the rotation axis direction of the steering wheels in accordance with the amount of rotation of the steering handle or in a second control mode for adjusting the rotation axis direction of the steering wheels in accordance with the operation of the sub-controller; and a mode selection switch configured to enter a command to cause the controller to selectively operate in the first control mode or in the second control mode; and, in the first control mode, the driver operates the steering valve by rotating the steering handle, and, in the second control mode, the driver performs work by the implement while operating the steering valve by operating the sub-controller.

According to the present disclosure, the following effects are achieved:

First, the RPM adjustment of the drive engine and the operation of an implement are separated and performed simultaneously during a work process, so that the risk of erroneous operation and the like is minimized and work efficiency is improved.

Second, the operations required for driving (gear shifting or steering) may be performed with the single operation lever, so that the available means of a driver's body can be more allocated to the operations of an implement, and thus, the operation of the implement becomes more accurate, thereby reducing the defective work rate.

Third, the individual operations may be independent and maintain intuitiveness (e.g., the operation of the control lever) or acquire intuitiveness (e.g., the operation of the operation lever or the operation of operation pedal for RPM adjustment), and the number of operation targets (the operation pedal, etc.) and the number of available means of a driver's body (hands and feet) are the same in a work process, so that the convenience of operation is improved.

DETAILED DESCRIPTION

Preferred embodiments according to the present disclosure will be described with reference to the accompanying drawings, but for the sake of brevity, descriptions of well-known components will be omitted or abridged as much as possible.

Figure 1:
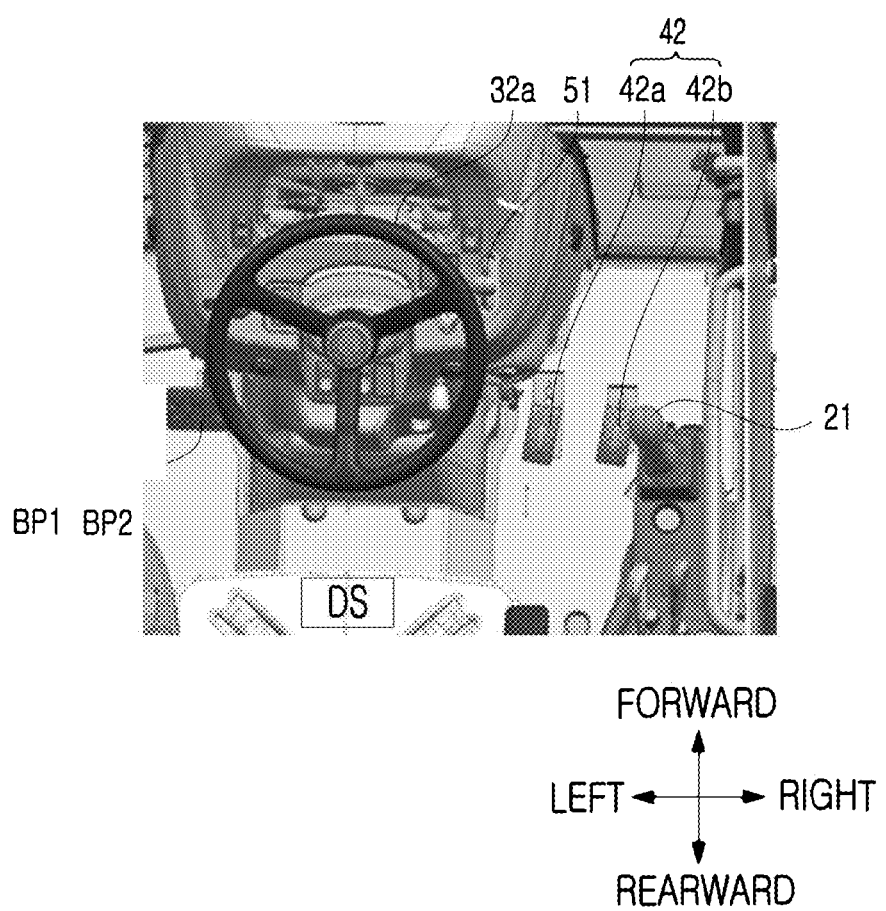
FIG. 1 shows the layout of a space where a driver's seat is located in a conventional agricultural tractor.
Figure 2:
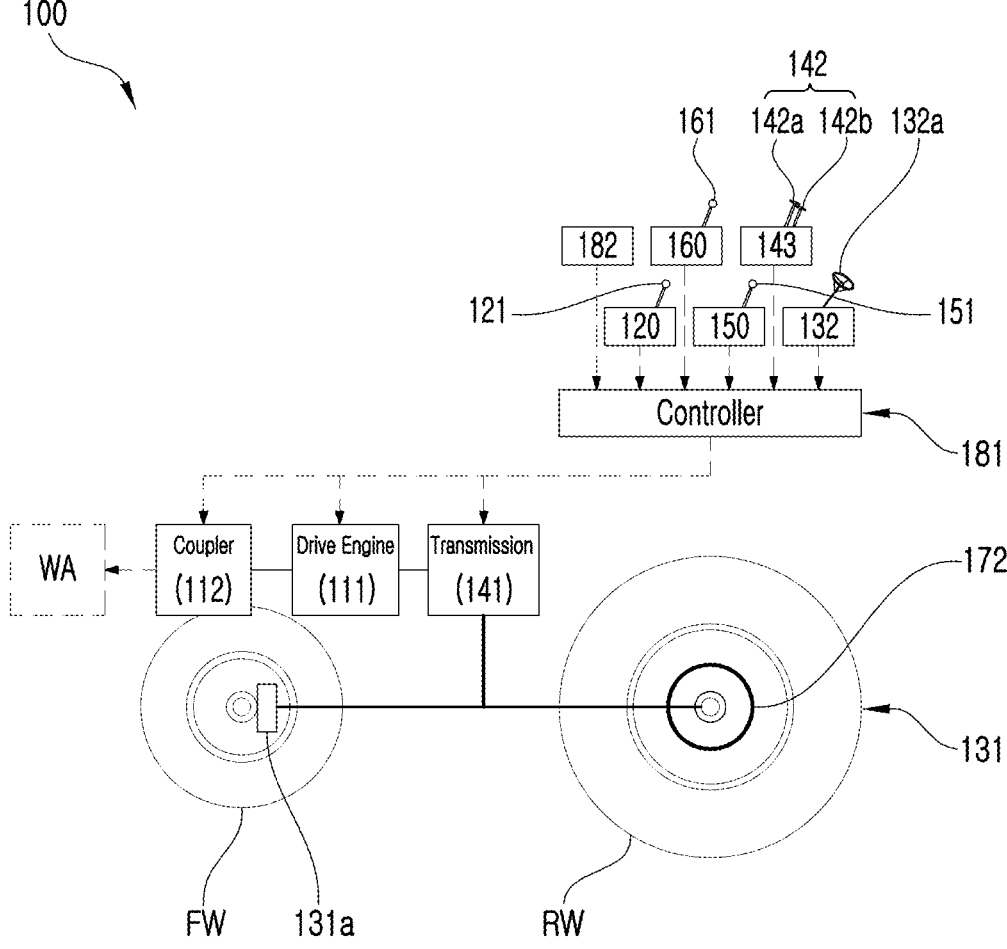
FIG. 2 is a view showing the configuration of an agricultural tractor according to one embodiment of the present disclosure.

FIG. 2 is a view showing the configuration of an agricultural tractor 100 according to one embodiment of the present disclosure.

Referring to FIG. 2, the agricultural tractor 100 includes a drive engine 111, a coupler 112, a work controller 120, a driving mechanism 131, a steerer 132, a transmission 141, operation pedals 142, pedal sensors 143, a governor 150, a sub-controller 160, a parking brake 172, a controller 181, and a mode selection switch 182.

The drive engine 111 generates driving power. The driving power generated by the drive engine 111 may be used as driving power by the driving mechanism 131, or may be used as working power by an implement WA.

When the RPM of the drive engine 111 is varied, the driving power is also varied. That is, the driving power is also lowered when the RPM of the drive engine 111 is lowered, and the driving power is also increased when the RPM of the drive engine 111 is increased.

The coupler 112 is provided to connect the implement WA. In this case, the implement WA may be one of various tools such as a loader and a backhoe, and may perform work by using the driving power of the drive engine 111.

The coupler 112 allows the implement WA to be mechanically mounted on the agricultural tractor 100, and connects the work power, generated from the driving power of the drive engine 111, to the implement WA.

For example, the coupler 112 may have a structure that connects the rotational power of the drive engine 111 to the implement WA.

For example, the coupler 112 may have a structure that connects the hydraulic pressure of a hydraulic pump configured to generate hydraulic pressure using the driving power of the drive engine 111 to the implement WA.

The work controller 120 is provided to control the work operation of the implement WA connected to the agricultural tractor 100. The work controller 120 includes a rod-shaped control lever 121

Figure 3:
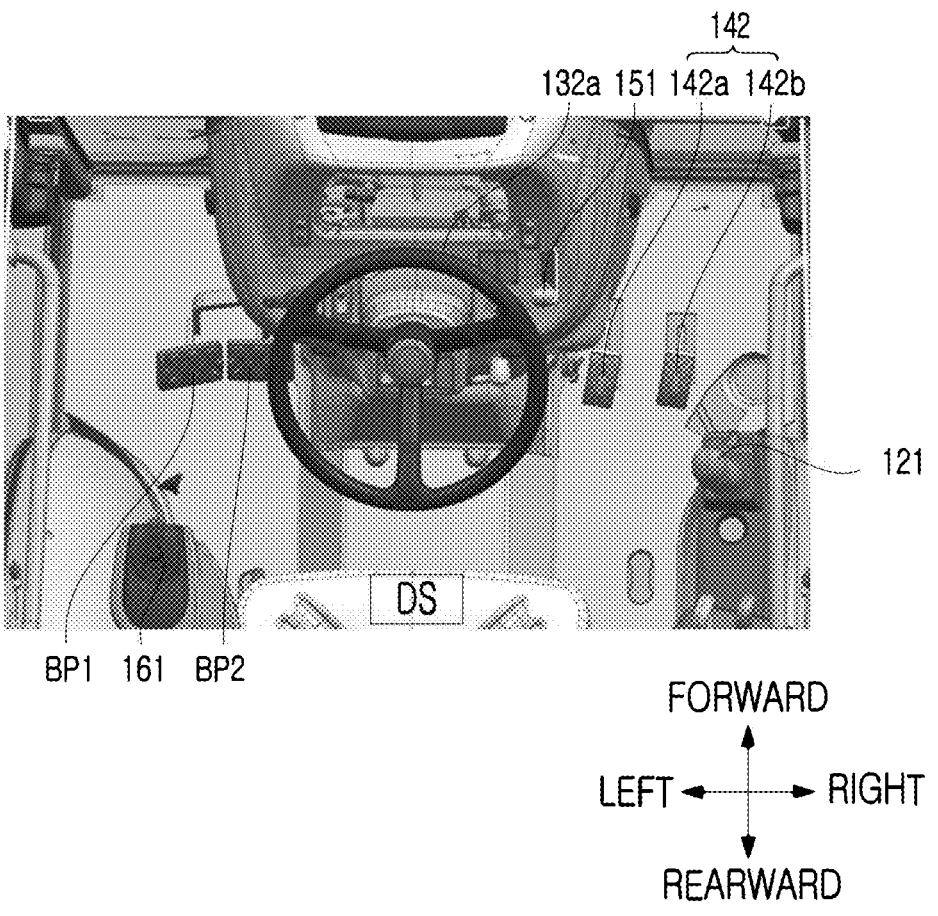
FIG. 3 shows the layout of a space where a driver's seat is located in the agricultural tractor of FIG. 2.

The control lever 121 is provided for a driver to operate it with his or her hand. Accordingly, as shown in the reference drawing of FIG. 3 showing the area of a driver's seat DS, the control lever 121 is disposed in an area that is accessible to the right hand of the driver sitting in the driver's seat DS. Therefore, the control lever 121 is disposed on the right side of a steering handle 132a. An example of the operation of the control lever 121 will be discussed in brief.

Figure 4:
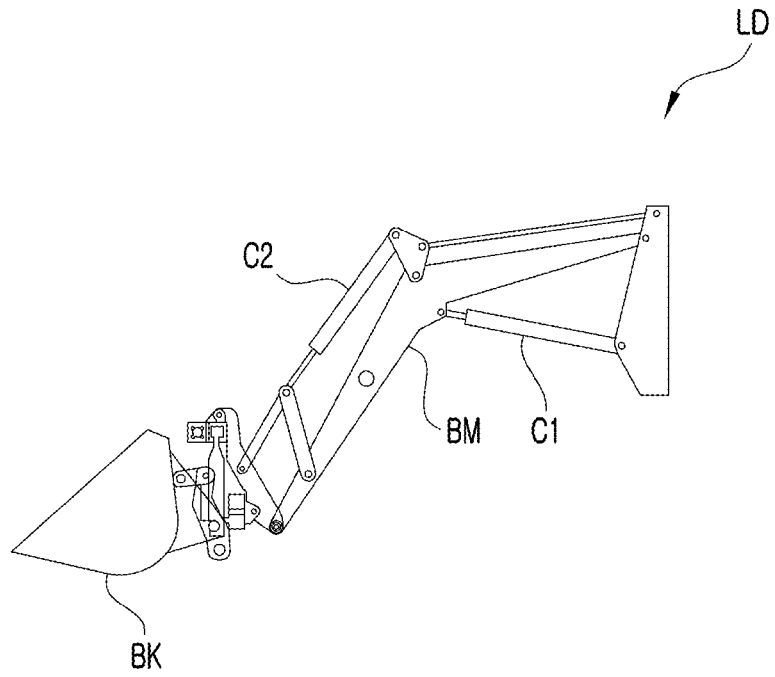
FIG. 4 is a schematic diagram of a loader, which is one of the implements that can be connected to the agricultural tractor of FIG. 2.

FIG. 4 is a schematic diagram of a loader LD, which is an example of the implement WA.

The loader LD includes a bucket BK and a boom BM, and has two hydraulic cylinders C1 and C2.

The first hydraulic cylinder C1 may raise and lower the bucket BK by rotating the boom BM, and the second hydraulic cylinder C2 may rotate the bucket BK. Furthermore, the two hydraulic cylinders C1 and C2 may be operated by operating the control lever 121.

The driver may operate the first hydraulic cylinder C1 by pushing the control lever 121 in the forward-rearward direction using the right hand.

The driver may operate the second hydraulic cylinder C2 by pushing the control lever 121 in the left-right direction using the right hand.

In addition, the driver may simultaneously operate the first and second hydraulic cylinders C1 and C2 by pushing the control lever 121 in the diagonal direction between the forward-rearward and left-right directions using the right hand.

The amounts of operation of the first and second hydraulic cylinders C1 and C2 are determined by the displacement values of the control lever 121. The displacement values are detected by a control sensor (not shown) in the work controller 120 and then sent to the controller 181, and the controller 181 operates the first and second hydraulic cylinders C1 and C2 in accordance with the displacement values.

The driving mechanism 131 is provided for the driving of the agricultural tractor 100.

The driving mechanism 131 is driven by the driving power of the drive engine 111.

The driving mechanism 131 includes front wheels FW and rear wheels RW. According to the present embodiment, the front wheels FW serve as steering wheels for changing the driving direction.

The driving mechanism 131 has a steering valve 131a.

The steering valve 131a controls the rotation axis direction of the front wheels FW, which are the steering wheels.

The steering valve 131a controls the rotation axis direction of the front wheels FW while being electronically controlled. A proportional control valve that can be electronically controlled may be preferably contemplated as the steering valve 131a.

The steerer 132 is provided to change the direction of the driving performed by the driving mechanism 131.

The steerer 132 has a steering handle 132a.

The steering handle 132a is provided in the form of a steering wheel.

As shown in the reference view of FIG. 3, the steering handle 132a is disposed in front of the driver sitting in the driver's seat DS.

The driver may adjust the rotation axis direction of the front wheels FW by rotating the steering handle 132a. When the driver rotates the steering handle 132a, the steering valve 131a rotates the rotation axis direction of the front wheels FW by an amount corresponding to the amount of rotation of the steering handle 132a. It is obvious that the steerer 132 is provided with a steering sensor (not shown) configured to detect the amount of rotation of the steering handle 132a, and the amount of rotation detected by the steering sensor is sent to the controller 181.

The transmission 141 transmits the driving power of the drive engine 111 to the driving mechanism 131.

The transmission 141 may perform the gear shifting of the driving mechanism 131 in the process of transmitting the driving power of the drive engine 111 to the driving mechanism 131.

According to the present disclosure, the transmission 141 may be electronically controlled. A hydrostatic transmission is planned as the transmission 141 applied to the agricultural tractor 100 according to the present embodiment.

The hydrostatic transmission may be electronically controlled.

A hydrostatic transmission may perform gear shifting by the rotation of a swash plate.

The operation pedals 142 may serve as gear shifting pedals configured to perform gear shifting by operating the transmission 141.

According to the present embodiment, a hydrostatic transmission is planned as the transmission 141, as described above. Accordingly, as referenced in FIG. 3, the operation pedals 142 may be provided in a pair on the right side under the steering handle 132a. The first operation pedal 142a is responsible for forward gear shifting, and the second operation pedal 142b is responsible for reverse gear shifting.

In addition, the operation pedals 142 may serve as speed adjustment pedals configured to adjust the RPM of the drive engine 111. According to a preferred example, the first operation pedal 142a of the two operation pedals 142a and 142b serves as a speed adjustment pedal. It is obvious that depending on the implementation, the second operation pedal 142*b* may be implemented to serve as a speed adjustment pedal.

According to the present disclosure, the operation pedals 142 may serve as both a gear shifting pedal and a speed adjustment pedal.

The pedal sensor 143 detects the amount of depression applied to the operation pedal 142. The amount of depression detected by the pedal sensor 143 is sent to the controller 181. Then, the controller 181 controls the transmission 141 to perform gear shifting corresponding to the amount of depression, or controls the drive engine 111 to adjust the RPM.

The governor 150 is provided to control the working power transmitted from the drive engine 111 to the implement WA. The driver may adjust the RPM of the drive engine 111 by operating the governor 150. Furthermore, the governor 150 may set the RPM of the drive engine 111 to a predetermined set value.

The governor 150 has a governor lever 151. The governor lever 151 is disposed near the steering handle 132*a*, as referenced in FIG. 3, and may be operated by the driver.

The driver may adjust the RPM of the drive engine 111 by pushing or pulling the governor lever 151 in one direction.

In addition, the driver may set the RPM value of the drive engine 111 to a specific value by fixing the governor lever 151 at a specific position.

The governor 150 has a governor sensor (not shown).

The governor sensor detects the displacement value of the governor lever 151 and sends it to the controller 181. Then, the controller 181 adjusts the RPM of the drive engine 111 to an RPM value corresponding to the displacement value of the governor lever 151.

The sub-controller 160 is provided to perform the gear shifting of the driving mechanism 131 by operating the transmission 141 separately from the operation pedal 142.

Furthermore, the sub-controller 160 is provided to change the driving direction of the drive mechanism 131 by operating the steering valve 131*a* separately from the steering handle 132*a*.

That is, according to the present disclosure, the sub-controller 160 is provided for gear shifting and steering.

As referenced in FIG. 3, the sub-controller 160 has a rod-shaped operation lever 161. The operation lever 161 is disposed in an area where the driver sitting in the driver's seat DS can operate it with the left hand. More specifically, the operation lever 161 is disposed on the left side of the steering handle 132*a*. An example of the operation of this operation lever 161 will be discussed in brief.

The driver may perform forward or reverse gear shifting corresponding to the amount of operation by pushing the operation lever 161 in the forward-rearward direction, which is a first direction, using the left hand.

The driver may change the driving direction of the driving mechanism 131 by pushing the operation lever 161 in the left-right direction, which is a second direction, using the left hand.

In addition, the driver may simultaneously perform gear shifting and steering by operating the operation lever 161 in the diagonal direction between the t forward-rearward and left-right directions using the left hand.

According to the present embodiment, the displacement value of the operation lever 161 in the forward-rearward direction determines the amount of gear shifting, and the displacement value in the left-right direction determines the amount of steering.

That is, according to the present disclosure, the driver may move the agricultural tractor 100 in a specific direction at an intended speed by pushing the operation lever 161 in a specific direction in which he or she desires to move the agricultural tractor 100. This operation method improves the driver's intuitiveness in operating the operation lever 161.

It is obvious that the sub-controller 160 has a displacement sensor (not shown) configured to detect the displacement value of the operation lever 161. The displacement sensor sends the detected displacement value to the controller 181. Then, the controller 181 controls the transmission 141 so that gear shifting corresponding to the displacement value in the forward-rearward direction is performed, and controls the steering valve 131*a* so that steering corresponding to the displacement value in the left-right direction is performed.

The parking brake 172 is provided to keep the agricultural tractor 100 stopped when the agricultural tractor 100 is parked.

When the driver operates the work controller 120, the steerer 132, the operation pedal 142, the governor 150, and the sub-controller 160, the controller 181 performs control corresponding to the operation.

When the work controller 120 is operated through the control lever 121, the controller 181 operates the implement WA by controlling the coupler 112.

For example, in the case where the loader LD is applied as the implement WA, when the work controller 120 is operated, the controller 181 controls the coupler 112 so that the loader LD is operated in accordance with the displacement value of the control lever 121. In this example, the coupler 112 has a hydraulic pump (not shown) and hydraulic circuit (not shown) configured to supply hydraulic pressure to the hydraulic cylinders C1 and C2. When the hydraulic cylinders C1 and C2 are operated under the control of the controller 181, the bucket BK and the boom BM move and the loader LD performs work as the driver performs control.

When the steerer 132 is operated via the steering handle 132*a*, the controller 181 controls the steering valve 131*a* to change the rotation axis direction of the front wheels FW by an amount corresponding to the amount of rotation of the steering handle 132*a*.

When the operation pedal 142 is operated, the controller 181 controls the transmission 141 to perform gear shifting corresponding to the amount of operation.

In the present embodiment, in particular, when the operation pedal 142 is operated, the controller 181 may control the drive engine 111 to have an RPM value corresponding to the amount of operation.

When the governor 150 is operated through the governor lever 151, the controller 181 controls the drive engine 111 to have an RPM value corresponding to the amount of operation. When the governor lever 151 is fixed at a specific position, the controller 181 controls the drive engine 111 to rotate at a set value corresponding to the specific position.

In the present embodiment, in particular, when the sub-controller 160 is operated through the operation lever 161, the controller 181 may control the transmission 141 to perform gear shifting corresponding to the amount of operation.

In the present embodiment, in particular, when the sub-controller 160 is operated through the operation lever 161, the controller 181 may control the steering valve 131*a* to change the rotation axis direction of the front wheels FW by an amount corresponding to the amount of operation.

Meanwhile, from the driver's perspective, the RPM of the drive engine 111 may be adjusted by operating the governor lever 151 and the operation pedal 142.

Furthermore, from the driver's perspective, gear shifting may be performed by operating the operation pedal 142 and the sub-controller 160.

Moreover, from the driver's perspective, gear shifting may be performed by operating the steering handle 132a and the sub-controller 160.

Meanwhile, it is necessary to prevent confusion when the driver operates the agricultural tractor 100. Accordingly, according to the present disclosure, a mode selection switch 182 is provided.

The mode selection switch 182 is provided to enter a command to cause the controller 181 to selectively operate in either a first control mode or a second control mode.

The first control mode and the second control mode will be described with reference to FIGS. 5 and 6, which show the main components of the agricultural tractor 100 according to the present disclosure.

Figure 5:
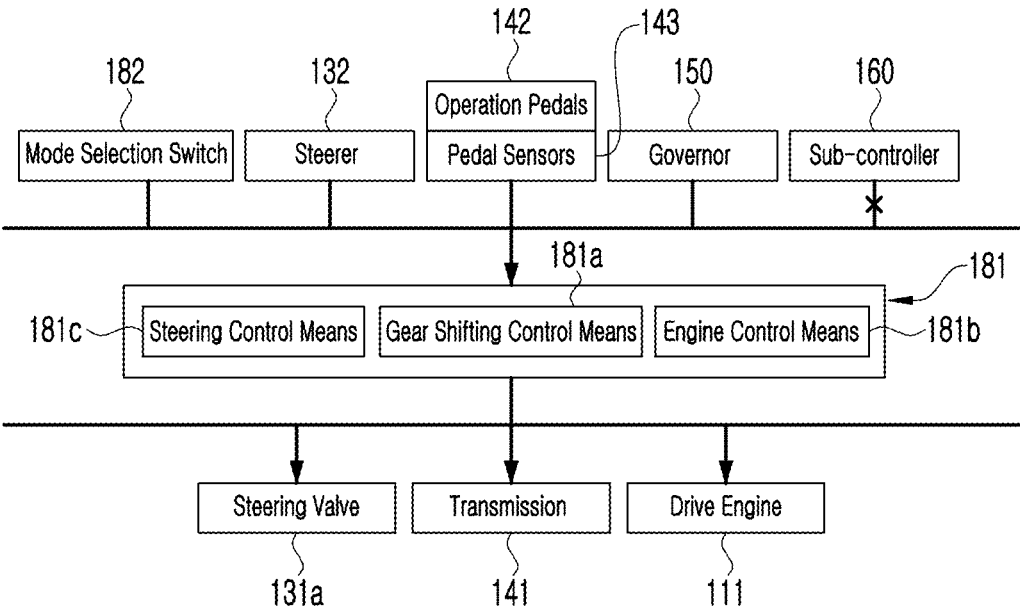
FIGS. 5 and 6 show the main components of the agricultural tractor of FIG. 2.
Figure 6:
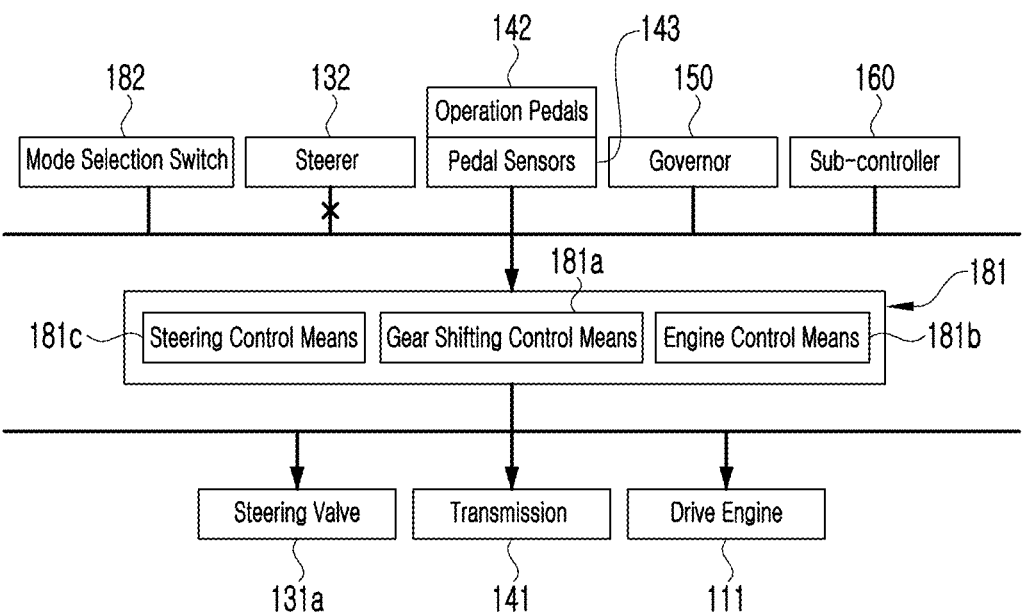

For reference, FIGS. 5 and 6 present detailed configurations of the controller 181 by function.

The controller 181 may include a gear shifting control means 181a, an engine control means 181b, and a steering control means 181c.

The gear shifting control means 181a basically controls the transmission 141 in accordance with the amount of depression of the operation pedal 142. Meanwhile, the gear shifting control means 181a according to the present embodiment is implemented to send the amount of depression of the operation pedal 142, received from the pedal sensor 143, to the engine control means 181b in the second control mode. Furthermore, the gear shifting control means 181a according to the present embodiment may control the transmission 141 in accordance with the operation of the sub-controller 160 in the second control mode.

The engine control means 181b basically adjusts the RPM of the drive engine 111 in accordance with the operation of the governor 150. Meanwhile, the engine control means 181b according to the present embodiment is implemented to adjust the RPM of the drive engine 111 in accordance with the amount of depression of the operation pedal 142, received from the gear shifting control means 181a, in the second control mode.

In the second control mode, the amount of depression of the operation pedal 142 is sent from the pedal sensor 143 to the engine control means 181b through the gear shifting control means 181a. In this case, the amount of depression of the operation pedal 142 needs to be converted into an RPM value. Accordingly, either the gear shifting control means 181a or the engine control means 181b may have a conversion function that converts the amount of depression of the operation pedal 142 into an RPM value. When the gear shifting control means 181a is provided with the conversion function, the amount of depression sent from the gear shifting control means 181a to the engine control means 181b becomes an RPM value obtained through conversion.

The steering control means 181c basically controls the steering valve 131a in accordance with the operation of the steerer 132. However, the steering control means 181c according to the present embodiment may control the steering valve 131a in accordance with the operation of the sub-controller 160 in the second control mode.

<First Control Mode>

FIG. 5 shows the first control mode in particular.

In the first control mode, a control path by the sub-controller 160 is deactivated.

In the first control mode, the RPM of the drive engine 111 is adjusted by the operation of the governor 150. When the driver operates the governor 150 through the governor lever 151, the engine control means 181b controls the drive engine 111, so that the RPM is adjusted.

In the first control mode, the gear shifting for forward and reverse driving is performed by the operation of the operation pedal 142. In the first control mode, the driver may perform forward and reverse gear shifting by using the first operation pedal 142a and the second operation pedal 142b. When the first operation pedal 142a or the second operation pedal 142b is operated by the driver, the pedal sensor 143 detects the amount of depression and sends a detected value (the amount of depression) to the gear shifting control means 181a. Then, the gear shifting control means 181a generates a first control signal corresponding to the detected value and controls the transmission 141. In this case, the first control signal collectively refers to signals adapted to control the transmission 141 in accordance with the amount of depression of the operation pedal 142.

In the first control mode, the changing of the driving direction is achieved by operating the steerer 132 through the steering handle 132a. When the driver rotates the steering handle 132a, the steering control means 181c controls the steering valve 131a to correspond to the amount of rotation of the steering handle 132a.

Therefore, in the first control mode, the driver in the driver's seat DS may perform work via the implement by performing forward and reverse gear shifting, the changing of the driving direction, deceleration, RPM setting and adjustment, and/or the operation of the implement WA, respectively, while operating the operation pedal 142 with the right foot, the steering handle 132a with the left hand, the brake pedals BP1 and BP2 with the left foot, the governor lever 151 with the right hand, and the control lever 121 with the right hand.

<Second Control Mode>

FIG. 6 shows the second control mode in particular.

In the second control mode, a control path by the sub-controller 160 is activated.

In the second control mode, RPM adjustment may be performed by operating the operation pedal 142. When the driver operates the operation pedal 142, the pedal sensor 143 detects the amount of depression and then sends a detected value (the amount of depression) to the gear shifting control means 181a. Then, the gear shifting control means 181a sends the detected value to the engine control means 181b. The engine control means 181b then generates a second control signal corresponding to the detected value and controls the drive engine 111. In this case, the second control signal collectively refers to signals adapted to adjust the RPM of the drive engine 111 in accordance with the amount of depression of the operation pedal 142.

It may be preferable that the operation pedal 142 configured to generate the second control signal in the second control mode is the first operation pedal 142a.

That is, according to the present disclosure, even when the same operation pedal 142 is operated, the controller 181 generates a first control signal in the first control mode, and generates a second control signal in the second control mode. As mentioned above, the first control signal is a signal adapted to perform gear shifting by controlling the transmission 141, whereas the second control signal is a signal adapted to adjust the RPM of the drive engine 111.

Meanwhile, even in the second control mode, the driver may fix the governor lever 151 at a specific position. Then, the engine control means 181b controls the drive engine 111 to have the RPM value of a set value corresponding to the fixed position of the governor lever 151. Meanwhile, when a detected value is received from the pedal sensor 143, the engine control means 181b compares an RPM value based on the detected value and an RPM value based on the set value and then controls the drive engine 111 using a larger RPM value.

In the second control mode, the gear shifting for forward or reverse driving is performed by operating the sub-controller 160 through the operation lever 161. In the second control mode, the gear shifting control means 181a controls the transmission 141 to perform forward or reverse gear shifting corresponding to the forward or reverse displacement value of the operation lever 161.

In the second control mode, the driving direction is changed by operating the sub-controller 160 through the operation lever 161. In the second control mode, the steering control means 181c controls the steering valve 131a to correspond to the left and right displacement value of the operation lever 161.

Therefore, in the second control mode, the driver in the driver's seat DS may not use the steering handle 132a. Instead, the driver in the driver's seat DS may perform work by the implement by performing forward and reverse gear shifting, the changing of the driving direction, deceleration, RPM setting, the operation of the implement WA, and/or RPM adjustment, respectively, while operating the operating lever 161 with the left hand, the brake pedals BP1 and BP2 with the left foot, the governor lever 151 with the right hand, the control lever 121 with the right hand, and the operation pedal 142 with the right foot.

The governor 150 in the second control mode may be sufficient if it is used for the driver to set an RPM value. Furthermore, an implementation may be made such that during a work process, an RPM value higher than a set RPM value required depending on the situation can be obtained in such a manner that the driver operates the operation pedal 142.

For reference, the driver may attempt to change the driving direction using the steering handle 132a even in the second control mode. In other words, the driver may change the driving direction using the steering handle 132a or the operation lever 161 even in the second control mode. This may be optional for the driver. However, depending on the implementation, design may be made such that a steering path using the steering handle 132a is deactivated in the second control mode.

Figure 7:
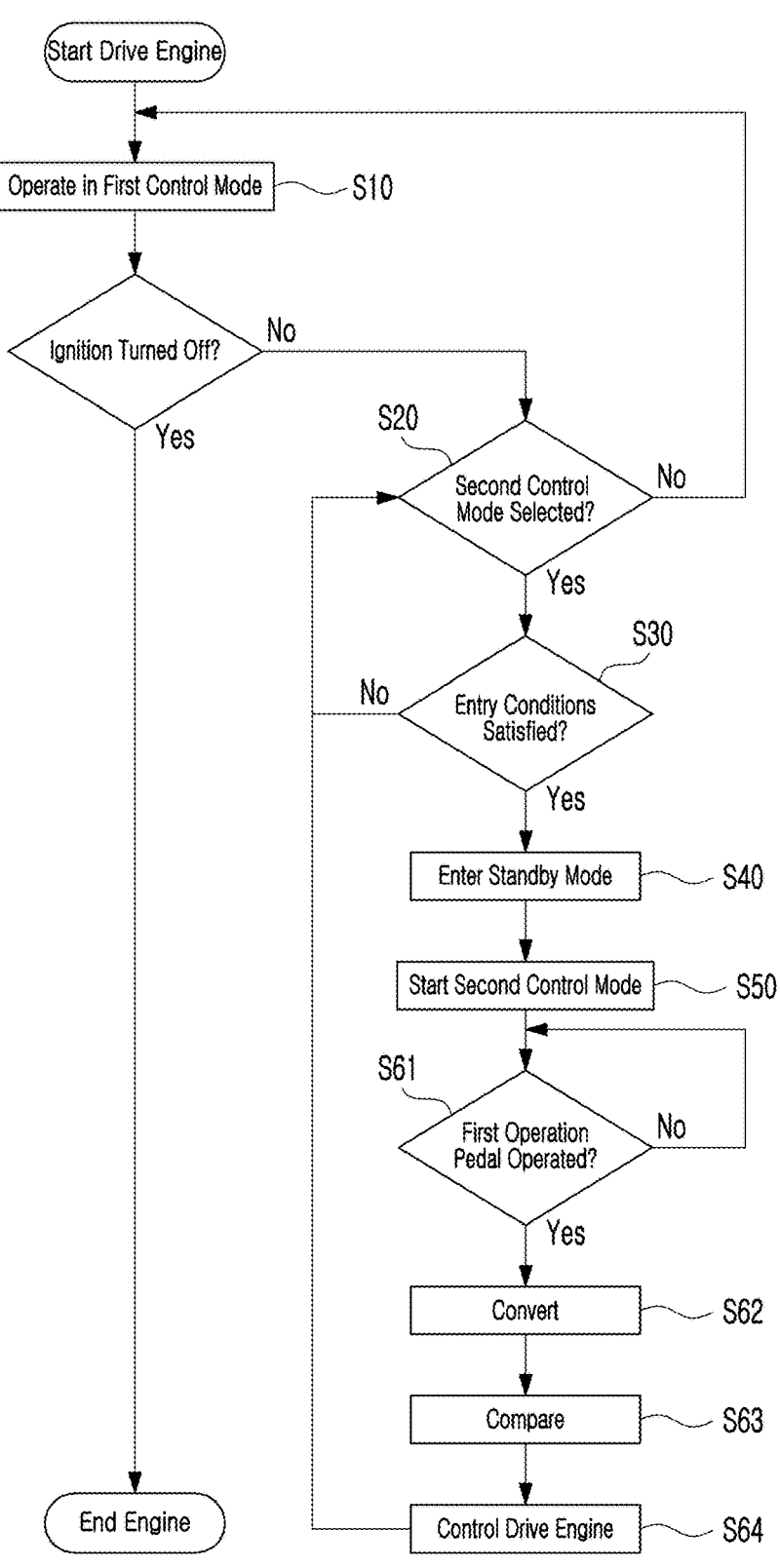
FIG. 7 is a flowchart illustrating RPM adjustment performed in the second control mode of the agricultural tractor of FIG. 2.

FIG. 7 is a flowchart for adjusting RPM using the operation pedal 142 in the second control mode, which is one of the important features of the present disclosure.

First, when the driver turns on the drive engine 111, the controller 181 operates in the first control mode in step S10.

While operating in the first control mode, the controller 181 checks whether the mode selection switch 182 has been operated and thus the second control mode has been selected in step S20.

When the second control mode has not been selected in step S20, the controller 181 continues to operate in the first control mode. However, when it is determined that the second control mode has been selected in step S20, the controller 181 performs checking to enter the second control mode. That is, the controller 181 checks whether the entry conditions for entry into the second control mode have been satisfied in step S30. In this case, the entry conditions may be the conditions in which the gear shifting ends between the transmission 141 and the driving mechanism 131 are engaged such that the power between the transmission 141 and the driving mechanism 131 is connected, the parking brake 172 has been released, and the RPM of the drive engine 111 is idle RPM.

When the entry conditions are not satisfied in step S30, the controller 181 may notify the driver of unsatisfied conditions. In this case, the notification may be made visually and/or audibly.

When it is determined that the entry conditions are satisfied in step S30, the controller 181 enters a standby mode in step S40.

In the standby mode, the controller 181 waits for the operation of the sub-controller 160 and the first operation pedal 142a. Then, the controller 181 controls the transmission 141 so that the vehicle speed is maintained at 0 km/h. In this case, a control signal adapted to control the transmission 141 is a neutral control signal adapted to maintain the vehicle speed at 0 km/h. The reason for controlling the vehicle speed to 0 km/h in this manner is that it is considered that when the second control mode starts while the vehicle speed does not reach 0 km/h, unpredictable operation may cause a risk. It is obvious that even in the standby mode, the mode selection switch 182 needs to still select the second control mode, and the entry conditions need to also be maintained in a satisfied state.

When the driver operates the operation lever 161 in step S40, the controller 181 starts operation in the second control mode in step S50.

In the second control mode, the controller 181 outputs control signals for forward and reverse gear shifting and left and right steering corresponding to the operation of the operating lever 161 and control the transmission 141 and the steering valve 131a. In this case, the forward and reverse gear shifting and steering may be appropriately adjusted by comparing a current vehicle speed value received from a vehicle speed sensor (not shown) and a current steering value received from a steering sensor (not shown) with the operation values of the operation lever 161.

Meanwhile, the controller 181 checks whether the driver has operated the first operation pedal 142a in step S61. In this case, the checking is the checking of whether a detected value has been received from the pedal sensor 143 by the operation of the first operation pedal 142a.

When it is determined that the first operation pedal 142a has been operated in step S61, the controller 181 converts a detected value corresponding to the amount of depression of the first operation pedal 142a into an RPM value in step S62. Then, the controller 181 compares the detected value, converted into the RPM value in step S62, with a set value set by the governor 150 in step S63.

Thereafter, the controller 181 selects a larger RPM value in step S80 and controls the drive engine 111 to rotate at the corresponding RPM value in step S64.

For reference, when the controller 181 starts operation in the second control mode according to step S50, forward and reverse driving and steering are also adjusted according to the second control mode in addition to the RPM adjustment in steps S61 to S64.

Additional Description

According to the above embodiment, the present disclosure has the following three important features.

First, the operation pedal 142 serves as a gear shifting pedal in the first control mode, and serves as an RPM pedal for adjusting RPM in the second control mode.

Second, in the second control mode, the driver may perform forward and reverse gear shifting by using the operation lever 161. Accordingly, another function (an RPM adjustment function in the present embodiment) may be assigned to the operation pedal 142.

Third, in the second control mode, the driver may change the driving direction by using the operation lever 161. Accordingly, the steering handle 132a may be unrelated to the driving of the agricultural tractor 100. In other words, the driver may change the driving direction without using the steering handle 132a.

The above three important features may be applied to the agricultural tractor 100 individually or together. In other words, one or more of the above three important features may be selectively applied to the agricultural tractor 100.

However, the agricultural tractor 100 to which all of the above features are applied may serve in the second control mode such that the operation pedal 142 adjusts the RPM of the drive engine 111. Furthermore, the one operation lever 161 is responsible for forward and reverse gear shifting and steering. Furthermore, the governor lever 151 may be used only for the purpose of setting an RPM value. Accordingly, unlike in the conventional method, the driver does not have to take his right hand off the control lever 121 to increase RPM during work. That is, the driver may increase the RPM of the drive engine 111 with the operation pedal 142 while controlling the implement WA with the control lever 121. Therefore, the operation of the implement WA may be performed continuously, and the work efficiency is improved accordingly.

It is obvious that even when the present disclosure is applied, the first control mode and the second control mode may be selected according to the driver's preference. For example, the driver may perform work in the first control mode or in the second control mode.

The above-described embodiments are described merely as preferred examples of the present disclosure, and may have various application forms. Therefore, the present disclosure should not be understood as being limited only to the content described above. Instead, the scope of the rights of the present disclosure should be understood based on the claims to be described separately and their equivalents.

The invention claimed is:

1. An agricultural tractor comprising:
a drive engine configured to generate driving power that varies according to variation of RPM;
a coupler configured to couple an implement capable of performing work by utilizing the driving power of the drive engine;
a work controller configured to control work operation of the implement;
a driving mechanism configured to perform driving with the driving power of the drive engine, and provided with steering wheels for changing a driving direction;
a steerer provided with a steering handle for adjusting a rotation axis direction of the steering wheels to change a direction of the driving performed by the driving mechanism;
a transmission configured to transmit the driving power of the drive engine to the driving mechanism, and also configured to be electronically controlled to perform gear shifting of the driving mechanism;
an operation pedal configured to perform gear shifting by operating the transmission or adjust RPM of the drive engine;
a pedal sensor configured to detect an amount of depression of the operation pedal;
a controller configured to operate in a first control mode for generating a first control signal corresponding to the amount of depression of the operation pedal detected by the pedal sensor or in a second control mode for generating a second control signal corresponding to the amount of depression of the operation pedal; and
a mode selection switch configured to enter a command to cause the controller to selectively operate in the first control mode or in the second control mode;
wherein the first control signal generated by the controller in the first control mode is a signal for controlling the transmission to perform gear shifting, and the second control signal generated by the controller in the second control mode is a signal for adjusting the RPM of the drive engine; and
wherein in the first control mode, a driver performs gear shifting by the transmission by operating the operation pedal, and in the second control mode, the driver performs work by the implement using the work controller while adjusting the RPM of the drive engine by operating the operation pedal.

2. The agricultural tractor of claim 1, further comprising a governor configured to adjust the RPM of the drive engine to control working power transmitted from the drive engine to the implement;
wherein in the first control mode, the controller adjusts the RPM of the drive engine in accordance with operation of the governor, and in the second control mode, the controller adjusts the RPM of the drive engine in accordance with an operation of the operation pedal.

3. The agricultural tractor of claim 2, wherein in the second control mode, the controller adjusts the RPM of the drive engine to a larger RPM value between an RPM value set by the governor and an RPM value corresponding to an operation of the operation pedal.

4. The agricultural tractor of claim 1, further comprising a sub-controller configured to perform gear shifting of the driving mechanism by operating the transmission;
wherein the controller performs gear shifting by controlling the transmission in accordance with the amount of depression of the operation pedal detected by the pedal sensor in the first control mode, and performs gear shifting by controlling the transmission in accordance with an operation of the sub-controller in the second control mode.

5. The agricultural tractor of claim 4, the driving mechanism further includes a steering valve for being electronically controlled to adjust the rotation axis direction of the steering wheels,
wherein the controller changes the rotation axis direction of the steering wheels by controlling the steering valve in accordance with an operation of the steering handle.

6. The agricultural tractor of claim 5, wherein:
the sub-controller is operable to operate the steering valve;
the controller changes the rotation axis direction of the steering wheels by controlling the steering valve in accordance with an operation of the steering handle in the first control mode, and changes the rotation axis direction of the steering wheels by controlling the steering valve in accordance with an operation of the sub-controller in the second control mode;

the sub-controller includes a rod-shaped operation lever; and in the second control mode, the controller performs gear shifting by controlling the transmission when the operation lever is operated in a first direction by the driver, and the controller changes the rotation axis direction of the steering wheels by controlling the steering valve when the operation lever is operated in a second direction perpendicular to the first direction.

7. The agricultural tractor of claim 6, wherein:

the work controller includes a rod-shaped control lever; and the operation lever is disposed on a left side of the steering handle and the control lever is disposed on a right side of the steering handle, so that the driver sitting in a driver's seat can operate the operation lever with a left hand and the control lever with a right hand.

8. The agricultural tractor of claim 1, wherein when the second control mode is selected by the mode selection switch, the controller waits for the driver's operation with the transmission controlled such that a vehicle speed becomes 0 km/h.

9. An agricultural tractor comprising:

a drive engine configured to generate driving power that varies according to variation of RPM;

a coupler configured to couple an implement capable of performing work by utilizing the driving power of the drive engine;

a work controller configured to control work operation of the implement;

a driving mechanism configured to perform driving with the driving power of the drive engine, and provided with steering wheels for changing a driving direction;

a steerer provided with a steering handle for adjusting a rotation axis direction of the steering wheels to change a direction of the driving performed by the driving mechanism;

a transmission configured to transmit the driving power of the drive engine to the driving mechanism, and also configured to be electronically controlled to perform gear shifting of the driving mechanism;

an operation pedal configured to perform gear shifting by operating the transmission;

a pedal sensor configured to detect an amount of depression of the operation pedal;

a sub-controller configured to perform gear shifting of the driving mechanism by operating the transmission;

a controller configured to operate in a first control mode for performing gear shifting corresponding to the amount of depression of the operation pedal detected by the pedal sensor or in a second control mode for performing gear shifting corresponding to an operation of the sub-controller; and a mode selection switch configured to enter a command to cause the controller to selectively operate in the first control mode or in the second control mode;

wherein in the first control mode, a driver performs gear shifting by the transmission by operating the operation pedal, and in the second control mode, the driver performs work by the implement using the work controller while performing gear shifting by the transmission by operating the sub-controller.

10. The agricultural tractor of claim 9, the driving mechanism further includes a steering valve for being electronically controlled to adjust the rotation axis direction of the steering wheels, wherein the controller changes the rotation axis direction of the steering wheels by controlling the steering valve in accordance with an operation of the steering handle.

11. The agricultural tractor of claim 10, wherein:

the sub-controller is operable to operate the steering valve;

the controller changes the rotation axis direction of the steering wheels by controlling the steering valve in accordance with an operation of the steering handle in the first control mode, and changes the rotation axis direction of the steering wheels by controlling the steering valve in accordance with an operation of the sub-controller in the second control mode;

the sub-controller includes a rod-shaped operation lever; and in the second control mode, the controller performs gear shifting by controlling the transmission when the operation lever is operated in a first direction by the driver, and the controller changes the rotation axis direction of the steering wheels by controlling the steering valve when the operation lever is operated in a second direction perpendicular to the first direction.

12. The agricultural tractor of claim 11, wherein:

the work controller includes a rod-shaped control lever; and the operation lever is disposed on a left side of the steering handle and the control lever is disposed on a right side of the steering handle, so that the driver sitting in a driver's seat can operate the operation lever with a left hand and the control lever with a right hand.

13. The agricultural tractor of claim 9, wherein when the second control mode is selected by the mode selection switch, the controller waits for the driver's operation with the transmission controlled such that a vehicle speed becomes 0 km/h.

14. An agricultural tractor comprising:

a drive engine configured to generate driving power that varies according to variation of RPM;

a coupler configured to couple an implement capable of performing work by utilizing the driving power of the drive engine;

a work controller configured to control work operation of the implement;

a driving mechanism configured to perform driving with the driving power of the drive engine, and provided with steering wheels for changing a driving direction and a steering valve for being electronically controlled to adjust a rotation axis direction of the steering wheels;

a steerer provided with a steering handle for adjusting the rotation axis direction of the steering wheels to change a direction of the driving performed by the driving mechanism;

a transmission configured to transmit the driving power of the drive engine to the driving mechanism, and also configured to be electronically controlled to perform gear shifting of the driving mechanism;

an operation pedal configured to perform gear shifting by operating the transmission;

a pedal sensor configured to detect an amount of depression of the operation pedal;

a sub-controller configured to adjust the rotation axis direction of the steering wheels by operating the steering valve;

a controller configured to operate in a first control mode for adjusting the rotation axis direction of the steering wheels in accordance with an amount of rotation of the steering handle or in a second control mode for adjusting the rotation axis direction of the steering wheels in accordance with an operation of the sub-controller; and a mode selection switch configured to enter a command to cause the controller to selectively operate in the first control mode or in the second control mode;

wherein in the first control mode, the driver operates the steering valve by rotating the steering handle, and in the second control mode, the driver performs work by the implement while operating the steering valve by operating the sub-controller.

15. The agricultural tractor of claim 14, wherein in the second control mode, the operation pedal is operable to control RPM of the drive engine.

16. The agricultural tractor of claim 14, wherein when the second control mode is selected by the mode selection switch, the controller waits for the driver's operation with the transmission controlled such that a vehicle speed becomes 0 km/h.

\* \* \* \* \*